US006754253B2

(12) United States Patent
Guey

(10) Patent No.: US 6,754,253 B2
(45) Date of Patent: Jun. 22, 2004

(54) RECEIVER ARCHITECTURE FOR TRANSMIT DIVERSITY IN CDMA SYSTEM

(75) Inventor: Jiann-Ching Guey, Apex, NC (US)

(73) Assignee: Ericsson Inc., Research Triangle Park, NC (US)

( * ) Notice: Subject to any disclaimer, the term of this patent is extended or adjusted under 35 U.S.C. 154(b) by 456 days.

(21) Appl. No.: 09/725,632

(22) Filed: Nov. 29, 2000

(65) Prior Publication Data

US 2002/0106008 A1 Aug. 8, 2002

(51) Int. Cl.[7] .................................................. H04B 1/69
(52) U.S. Cl. ...................................................... 375/148
(58) Field of Search ................................ 375/130, 147, 375/148, 267, 316, 340, 341, 347, 142, 143, 150, 152, 346, 261, 222; 370/369, 342, 335, 441; 455/132, 137

(56) References Cited

U.S. PATENT DOCUMENTS

| | | | | |
|---|---|---|---|---|
| 5,881,057 A | * | 3/1999 | Komatsu | 370/335 |
| 6,128,330 A | * | 10/2000 | Schilling | 375/141 |
| 6,301,293 B1 | * | 10/2001 | Huang et al. | 375/130 |
| 6,317,411 B1 | * | 11/2001 | Whinnett et al. | 370/204 |
| 6,370,129 B1 | * | 4/2002 | Huang | 370/329 |
| 6,466,610 B1 | * | 10/2002 | Schilling | 375/141 |
| 6,473,467 B1 | * | 10/2002 | Wallace et al. | 375/267 |
| 6,516,022 B2 | * | 2/2003 | Ozluturk et al. | 375/152 |

FOREIGN PATENT DOCUMENTS

| | | |
|---|---|---|
| EP | 0999652 A1 | 11/2000 |
| EP | 001170897 A1 * | 9/2002 |
| JP | 2000315966 | 12/2000 |

* cited by examiner

*Primary Examiner*—Tesfaldet Bocure
(74) *Attorney, Agent, or Firm*—Coats & Bennett, P.L.L.C.

(57) ABSTRACT

A transmit diversity scheme for a CDMA system uses space-time codes to obtain diversity gain. Combined diversity signals encoded according to a space-time code are received at the mobile terminal during first and second symbol periods. The mobile terminal includes a first Rake receiver matched to a first transmit antenna and a second Rake receiver matched to a second transmit antenna. The first Rake receiver combines multipath echoes of the first combined signal during the first symbol period to obtain a first value and combines the multipath echoes corresponding to the second combined signal during the second symbol period to obtain a second value. The second Rake receiver combines multipath echoes corresponding to the first combined signal to obtain a third value and combines multipath echoes corresponding to the second combined signal to obtain a fourth value. A decoder decodes the first, second, third, and fourth values to obtain final estimates of the transmitted symbols.

17 Claims, 7 Drawing Sheets

RECEIVER ARCHITECTURE FOR TRANSMIT DIVERSITY IN CDMA SYSTEM

BACKGROUND OF THE INVENTION

The present invention relates to a receiver for receiving transmit diversity signals in a Code Division Multiple Access (CDMA) system.

The next generation of wireless communication systems are expected to provide high voice quality as compared to current mobile communication systems and to provide high bit rate data services. At the same, mobile terminals are expected to be light-weight, more power-efficient, and inexpensive. Furthermore, mobile terminals are expected to operate reliably in many types of communication systems, and in many different environments, such as urban, suburban, and rural. In other words, next generation systems are supposed to have better quality, be more power and bandwidth efficient, and be deployed in more diverse environments, yet remain affordable for widespread market acceptance.

In many ways, the design of radiocommunication systems is made more difficult by the nature of the radio propagation channel. One phenomenon which makes radiocommunications more difficult than some other forms of communication is multi-path fading. Multi-path fading is one result of multi-path propagation which exists in radiocommunication environments. In most radiocommunication systems, there is no direct line of sight between the base station and mobile terminal. The presence of buildings, trees, hills, and other objects in the environment surrounding the mobile terminal reflect and scatter radiowaves transmitted by the base station. Thus, a signal transmitted by the base station may arrive at the mobile terminal from many different directions with different propagation delays. One effect of multi-path propagation is that the various multipath components of a received signal exhibit varying degrees of distortion, particularly in phase and amplitude. The multipath components of the transmitted signal may combine in a variety of ways, causing fluctuations in signal strength. This phenomenon is known as Rayleigh fading. For example, if two reflected signals are 180° out-of-phase with one another, the two signals will cancel each other out. In effect, the signal disappears. Other partial out-of-phase relationships among multiple copies of a received signal produce lesser reductions in received signal strength. The degree of fading will vary as the mobile moves from one location to another so that the degree of fading experienced by the mobile terminal fluctuates. Multipath fading is one of the most significant challenges faced by the communications engineer.

One countermeasure commonly used to combat multipath fading is known as diversity. The concept of diversity is relatively simple. If several replicas of a message signal are transmitted simultaneously over independently fading channels, there is a good likelihood that at least one of the received signals will not be severely degraded by fading. Even in circumstances where each replica experiences fading, the multiple replicas may be combined in such a manner to create a usable signal.

There are many forms of diversity, including frequency diversity, time diversity, and space diversity. In frequency diversity, the message signal is transmitted using different carrier frequencies that are spaced sufficiently apart from each other to provide independently fading versions of the signal. In time diversity, the same message signal is transmitted in differing time periods. In space diversity, multiple transmitting or receiving antennas are used with spacing between adjacent antennas chosen so as to assure the independence of fading events. A diversity receiver selects or combines the received signals to improve the signal-to-noise ratio at the receiver.

BRIEF SUMMARY OF THE INVENTION

The present invention relates to a receiver for diversity reception in CDMA systems. The receiver receives first and second diversity signals during first and second symbol periods respectively. The first and second diversity signals represent first and second transmit symbols encoded and transmitted from two antennas according to a space-time code. During transmission, the transmitted symbols are distorted by the channel and combine with one another to form a combined received signal. The combined received signal arrives at the mobile terminals over numerous multipath propagation channels. The receiver at the mobile terminal selects a first set of multipath echoes associated with the first symbol period and selects a second set of multipath echoes associated with the second symbol period. In one embodiment, the multipath echoes are separately decoded and then combined to obtain final estimates of the transmitted symbols. In another embodiment, the first set of multipath echoes are combined in a first Rake receiver matched to the first transmit antenna to obtain a first value and are combined with a second Rake receiver matched to the second transmit antenna to obtain a second value. The second set of multipath echoes are combined with the first Rake receiver to obtain a third value and are combined with the second Rake receiver to obtain a fourth value. A decoder decodes the first, second, third, and fourth values to obtain estimates of the originally-transmitted symbols.

DETAILED DESCRIPTION OF THE INVENTION

Figure 1:
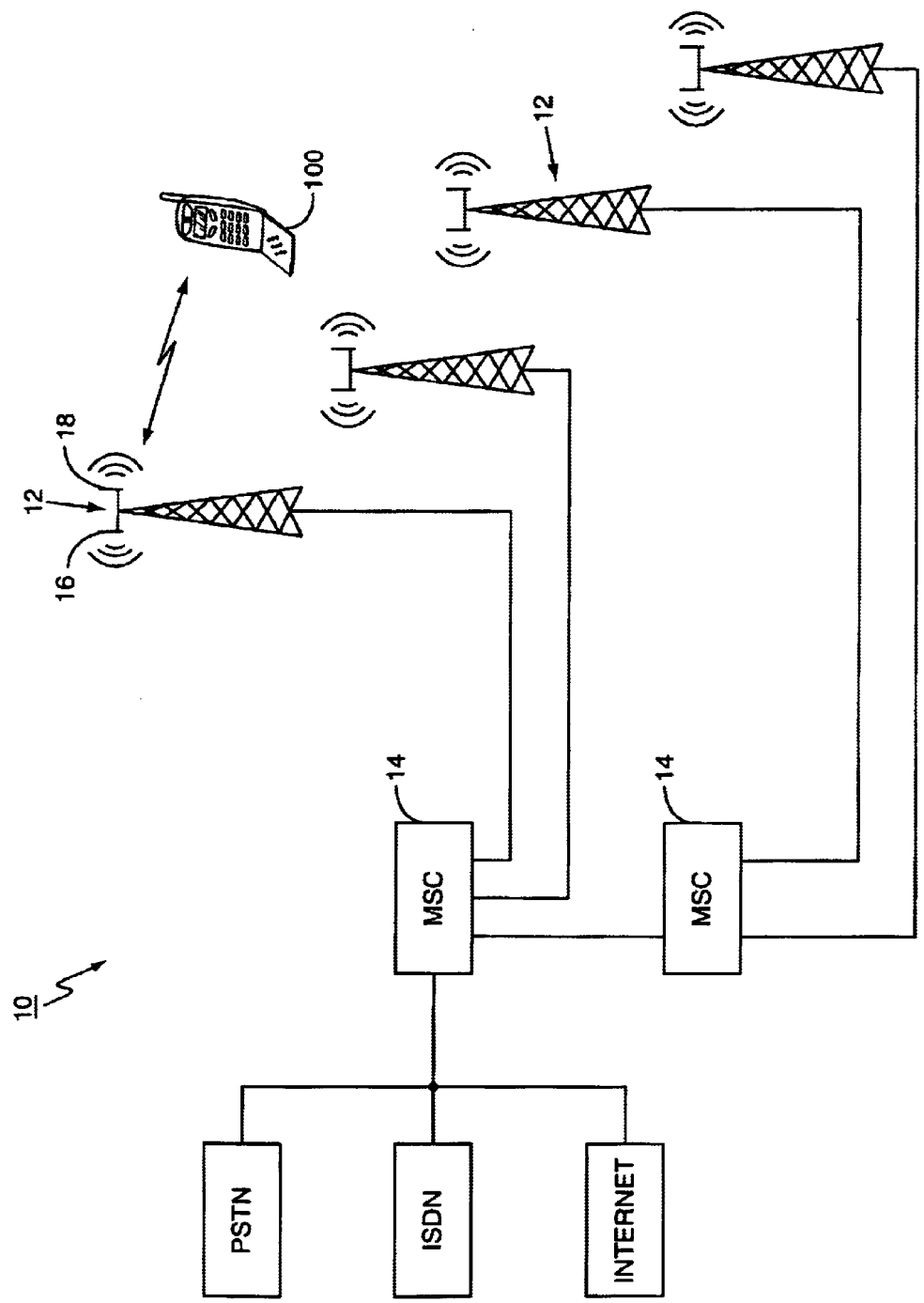
FIG. 1 is a schematic drawing of a mobile network.

Referring now to FIG. 1, the present invention will be discussed in the context of a wireless communications network 10 supporting over-the-air communications between mobile terminals 100 and stationary receivers generally known as base stations 12. Base stations 12 connect via one or more mobile services switching centers (MSC) 14 to external wireline networks such as the Public Switched Telephone Network (PSTN), the Integrated Services Digital Network (ISDN), and/or the Internet. Each base station 12 is located in and provides wireless communication services to a geographic region referred to as a cell. In general, there is one base station 12 for each cell within a given wireless communications network 10. Within each cell, there may be a plurality of mobile terminals 100 that communicate via radio link(s) with a serving base station 12. The base station 12 allows the users of the mobile terminals 100 to communicate with other mobile terminals 100, or with users connected to the external network. The MSC 14 routes calls to and from the mobile terminal 100 through the appropriate base station 12 or gateway, i.e. interface between a MSC 14 and external network.

Each base station 12 may be capable of diversity transmission, and thus, may have two antennas 16, 18, as is well understood in the art. The particular type of diversity transmission is not material to the present invention, but the present invention is well suited for use with space-time codes (STC), such as Orthogonal Transmit Diversity (OTD), Space-Time Spreading (STS), or Space-Time Transmit Diversity (STTD). The present invention may also be used with the trellis-based STC described in "Space-time codes for High Data Rate Wireless Communication: Performance Criterion and Code Construction," published in *IEEE Trans. Information Theory*, Vol. 44, No. 2, Mar, 1998, pp. 744–765, which is incorporated herein by reference.

Many standards exist for wireless communication networks 10. Such standards are published, for example, by the Telecommunications Industry (TIA), Electronics Industry Association (EIA), and European Telecommunications Standards Institute (ETSI). Exemplary standards for CDMA systems include TIA/EIA Interim Standard IS-95, TIA/EIA Interim Standard IS-2000, known as cdma2000, currently in development in the United States, and the Wideband CDMA (WCDMA) standard currently being developed for Europe.

Figure 2:
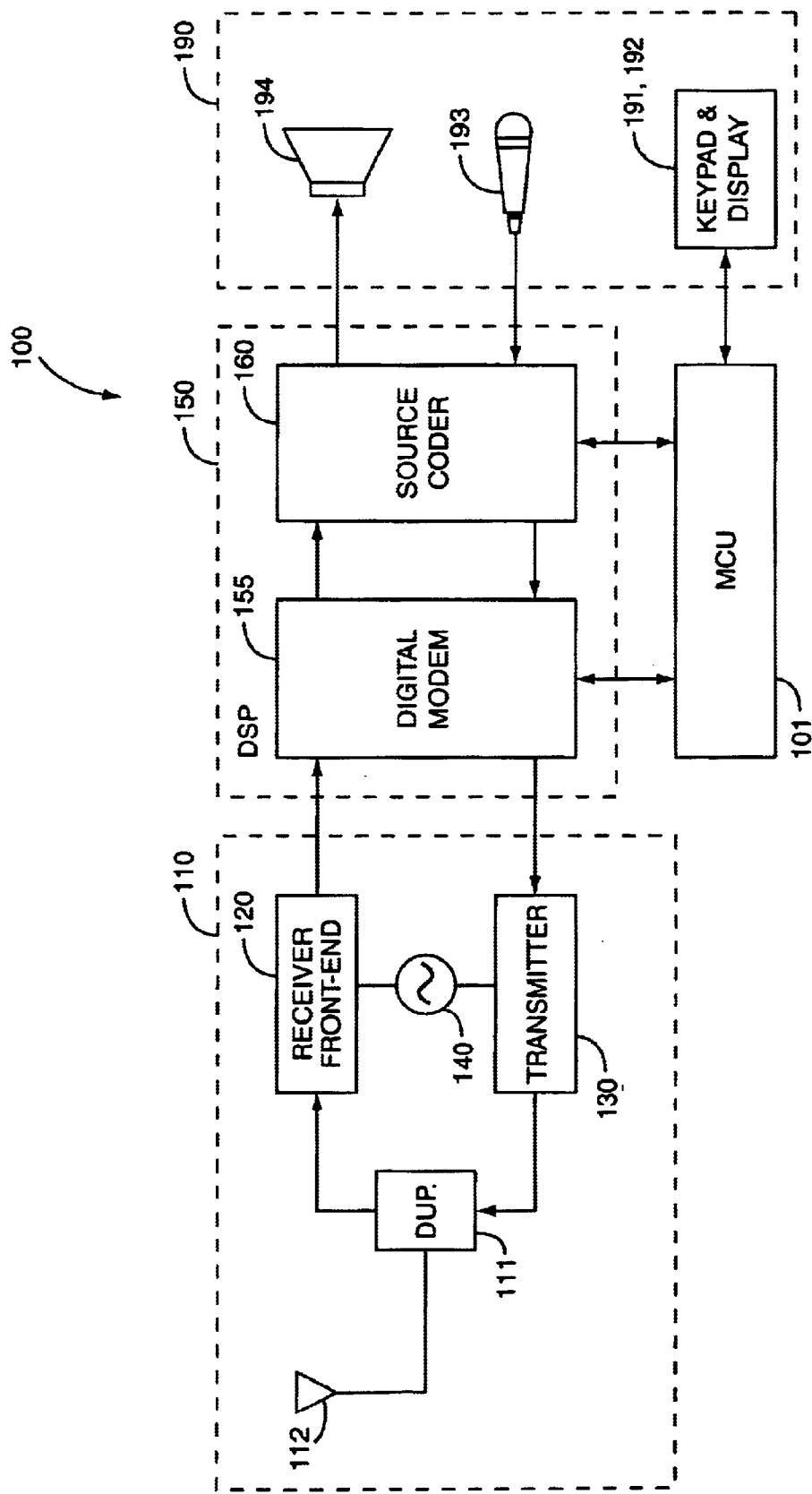
FIG. 2 is a block diagram of a mobile terminal amenable for use with the present invention.

FIG. 2 is a block diagram of a mobile terminal 100. The term "mobile terminal" 100 as used herein includes a cellular radiotelephone; a Personal Communications Service (PCS) terminal that may combine a cellular radiotelephone with data processing, facsimile and data communications capabilities; a Personal Digital Assistant (PDA) that can include a radiotelephone, pager, Internet/intranet access, Web browser, organizer, calendar; a conventional laptop and/or palmtop computer equipped with a radiotelephone transceiver, or other appliance that includes a radiotelephone transceiver. Mobile terminals may also be referred to as "pervasive computing" devices.

Mobile terminal 100 comprises a microcontroller unit (MCU) 101, an RF transceiver 110, a digital signal processor (DSP) 150, and a user interface 190. Mobile terminal 100 may additionally include an external interface for communication with a computer, local area network, or other device.

RF transceiver 110 establishes a link for wireless communications with the base station 12. RF transceiver 110 comprises a receiver front-end 120, transmitter 130, frequency synthesizer 140, duplexer 111, and antenna 112. Receiver front-end 120 and transmitter 130 are coupled to antenna 112 by duplexer 111. Duplexer 111 may include a duplex filter to isolate the transmitter 130 from the receiver front-end 120. The duplex filter combines a transmit-band filter and receiver-band filter to provide the necessary isolation between the two paths.

Receiver front-end 120 receives downlink or forward link communications from the base station 12. Receiver front-end 120 amplifies and downconverts received signals to the baseband frequency of the DSP 150. Signals converted by receiver front-end 120 to the baseband frequency are referred to herein as baseband signals.

Transmitter 130 sends uplink or reverse link communications to the base station 12. Transmitter 130 receives baseband signals from the DSP 150, which the transmitter 130 amplifies and uses to modulate an RF carrier at a directed power level.

Frequency synthesizer 140 provides the reference signals used for frequency translation in the receiver front-end 120 and transmitter 130. DSP 150 comprises a source coder 160 and digital modem 155. Source coder 160 includes a speech coder for digitizing and coding speech for transmission on the reverse link to the base station 12. Additionally, the speech coder decodes speech signals received from the base station 12 on the downlink and converts speech signals into audio signals that are output to a speaker 194. CDMA systems typically use an efficient method of speech coding and error recovery techniques to overcome the harsh nature of the radio channel. One speech coding algorithm frequently used in CDMA systems is Code Excited Linear Predictor (CELP) speech coding. Speech is typically encoded at rates of 9.6 kilobits per second or 13.3 kilobits per second. The details of speech coding are not material to the invention and, therefore, are not explained in detail herein.

The digital modem 155 processes digital signals to make communication over the propagation channel more robust. Digital modem 155 includes a digital modulator and a demodulator. The digital modulator superimposes the message waveform onto a carrier for radio transmission using algorithms that guard against fading and other impairments of the radio channel while attempting to maximize bandwidth efficiency. The digital modulator also performs channel coding and encryption if used. The digital demodulator detects and recovers the message signal transmitted by the base station 12. It tracks the received signal, rejects interference, and extracts the message data from noisy signals. The digital demodulator also performs synchronization, channel decoding, and decryption if used.

Figure 3:
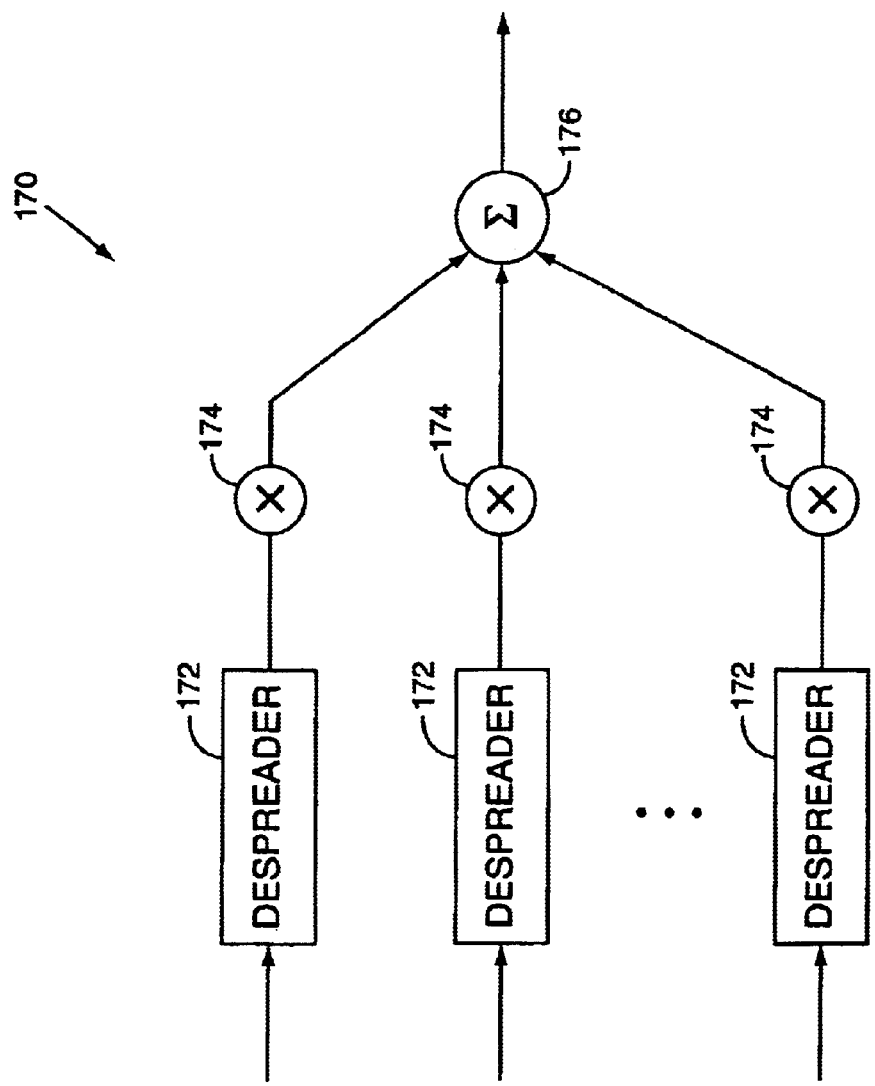
FIG. 3 is a block diagram of a Rake receiver.

In conventional CDMA systems, a Rake receiver 170, as shown in FIG. 3, is used to resolve the multipath echoes of the transmitted signal. The Rake receiver 170 is typically implemented in the digital modem 155. The Rake receiver 170 comprises a plurality of fingers. Each finger includes a correlator or despreader 172 that correlates a spreading waveform with a time-adjusted version of the received signal to obtain one multipath echo. The multipath echoes output by despreaders 172 are multiplied by weighting coefficients at multiplication nodes 174. The weighting coefficients are based on the strength of each multipath echo so that the strongest echo is weighted more heavily. The weighted and time-adjusted echoes are then summed in a combiner 176 to obtain the final version of the received signal. Each echo is time adjusted and correlated with the spreading waveform.

The microcontroller unit 101 supervises the operation of the mobile terminal 100 and administers the procedures associated with the communication protocol. The microcontroller unit 101 typically comprises a microprocessor, arithmatic logic unit (ALU), timers, and register files. The ALU performs various logic functions, such as comparisons, and supports computationally-demanding tasks. It may incorporate specialized hardware to accelerate mathematical operations, such as division and squaring. The microcontroller unit 101 assigns timers to track network time and uses that information to identify data frame boundaries and slot indexes. It also uses timers to trigger specific tasks as the mobile terminal 100 transitions to different operating modes, such as sleep, receive, and talk. The microcontroller unit 101 uses register files to store calibration data, the electronic serial number (ESN) of the user (used to authenticate the user), and other non-volatile information.

The microcontroller unit 101 implements the communication protocols used by the mobile terminal 100. The communication protocol specifies timing, multiple access approach, modulation format, frame structure, power level, as well as many other aspects of mobile terminal operation. The microcontroller unit 101 inserts signaling messages into the transmitted signals and extracts signaling messages from the received signals. Microcontroller unit 101 acts on signaling messages received from the base station 12 as set forth in the communication protocol. When the user enters commands via the user interface 190, the commands are passed to the microcontroller unit 101 for action.

The microcontroller unit 101 and DSP 150 use dedicated or shared buses to connect to memory. Memory is typically segmented into blocks that hold the start-up code, control software, DSP firmware, and temporary data.

User interface 190 may comprise a keypad 191, a display 192, a microphone 193, a speaker 194 and other user input and output devices as is well understood.

The mobile terminal 100 of the present invention is a receiver for a CDMA communications system that employs a relatively simple diversity scheme which improves the signal quality at the mobile terminal 100. The receiver processes diversity signals transmitted from antenna 16, 18 at the base station 12 using space and time diversity. The present invention may be carried out using a class of codes referred to herein as Space-time codes (STCs). One type of STC known as Space Time Transmit Diversity (STTD) will be used to illustrate an exemplary embodiment of the invention, however, other codes may also be used to practice the present invention.

In the STTD scheme, every four bits, denoted $b_1$, $b_2$, $b_3$, and $b_4$, transmitted by the base station 12 are mapped to two QPSK symbols as follows:

$$s_1 = b_1 + jb_2 \quad (1)$$

$$s_2 = b_3 + jb_4 \quad (2)$$

The symbols are transmitted by two antennas 16, 18 at the base station 12 as shown in Table 1 below.

TABLE 1

Encoding and Transmission Sequence for Space Time Transmit Diversity

|  | time t | time t + T |
|---|---|---|
| Antenna 1 | $s_1$ | $-s_2^*$ |
| Antenna 2 | $s_2$ | $s_1^*$ |

The first antenna 16 transmits symbol $s_1$ during a first symbol period and then transmits symbol $-s_2^*$ during the next symbol period. The length of a symbol period is denoted by T. The second antenna 18 transmits symbol $S_2$ during the first symbol period and then transmits symbol $s_1^*$ during the second symbol period. This mapping was proposed by Siavash M. Alamouti in a paper entitled "A Simple Transmit Diversity Technique for Wireless Communications," published in IEEE Journal on Select Areas in Communications, Vol. 16, No. 8, October 1998, which is incorporated herein by reference. Both antennas 16, 18 may use the same spreading sequence or may use different spreading sequence depending on the receiver architecture. Transmitted symbols $s_1$ and $s_2$ are referred to herein as the first diversity signals. Symbols $-s_2^*$ and $s_1^*$ are referred to herein as the second diversity signals.

Figure 4:
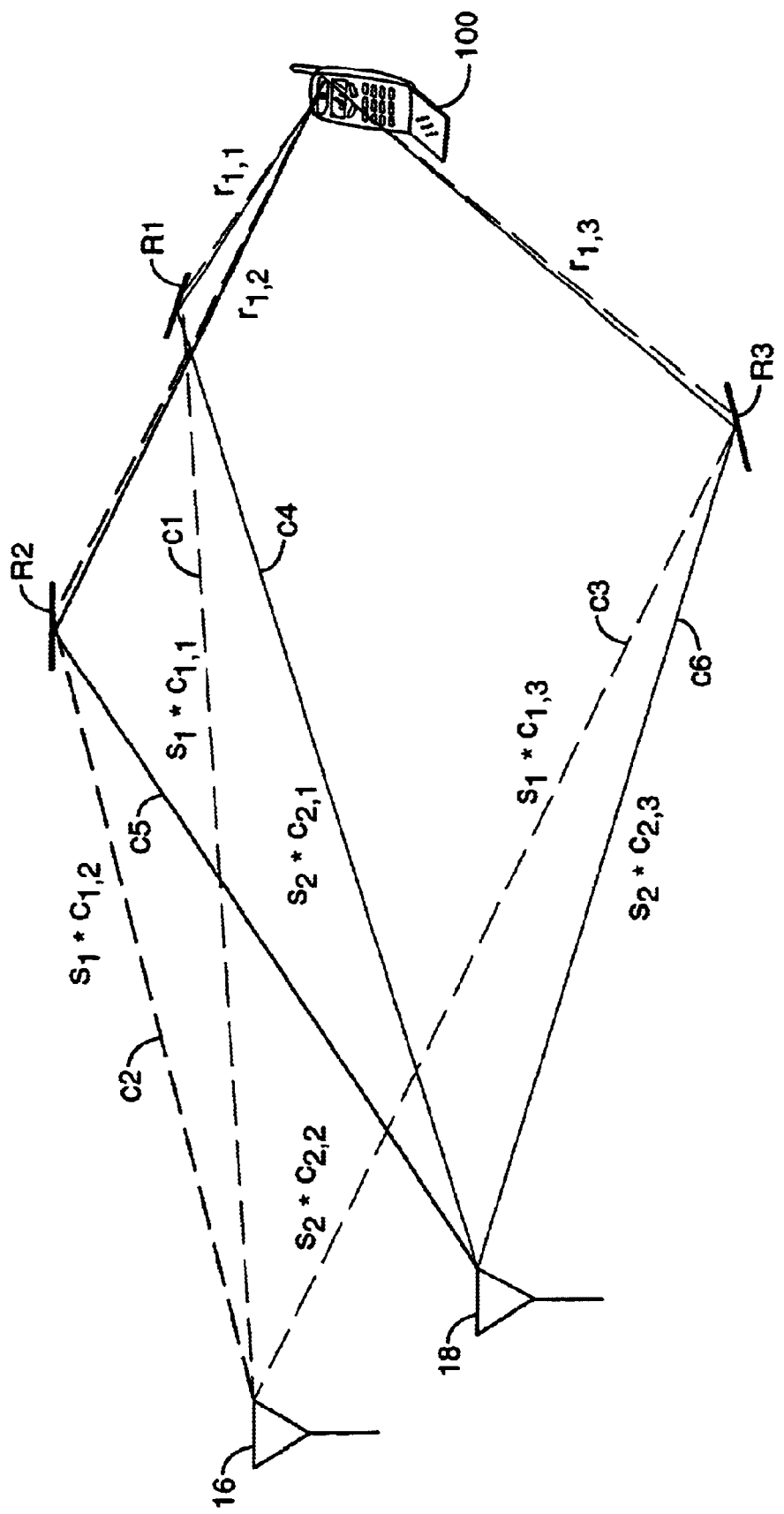
FIG. 4 is a schematic diagram illustrating propagation of diversity signals in the present invention.

The transmitted diversity signals propagate over numerous multipath propagation channels from each antenna 16, 18 as shown in FIG. 4. Each multipath propagation channel may be viewed as a linear filter. Each multipath propagation channel has a corresponding channel response that is estimated by the mobile terminal 100. The channel estimate for a multipath propagation channel is denoted by $c_{i,l}$, where i represents a particular antenna 16, 18 and l represents one multipath propagation channel from the antenna 16, 18 to the mobile terminal 100.

After spreading and multipath propagation, the transmit signal corresponding to the $l^{th}$ multipath echo over a two symbol interval can be expressed as;

$$g_l(t) = (c_{1,l}s_1 + c_{2,l}s_2)p_T(t - \tau_l) + (-c_{1,l}s_2^* + c_{2,l}s_1^*)q_T(t - T - \tau_l), \quad (3)$$

where $c_{i,l}$ is the channel coefficient of the l'th path in the i'th antenna path, $\tau_l$ is the path delay and $p_T$ and $q_T$ are wideband spreading waveforms with unit energy and duration T. With proper antenna placement, the fading effects in each multipath propagation channel are statistically independent from each other. Therefore, diversity gain can be obtained when the energy of the multipath echoes are combined by the diversity receiver.

At the receiver, the combined received signal can be expressed as:

$$r(t) = \sum_{l=1}^{L} g_l(t) + z(t) \quad (4)$$

where L is the total number of multipath echoes in the channel, and z(t) is Additive White Gaussian Noise (AWGN). The optimal detector tries to find the symbols that minimize the Mean Square Error (MSE) between the received signal r(t) and the hypothesized signal:

$$\{\hat{s}_1, \hat{s}_2\} = \arg\min_{s_1, s_2} \int \left| r(t) - \sum_{l=1}^{L} g_l(t) \right|^2 dt \quad (5)$$

In a CDMA receiver, the multipath echoes are resolved using a Rake receiver. For the l'th echo, the combined received signal r(t) is time adjusted and correlated with the spreading waveform corresponding to the symbol being despread. The despread values corresponding to the same symbol are summed over all L multipath echoes giving the final value of the symbol being demodulated. This process is embodied in Equation (5) above.

FIG. 4 illustrates transmissions from antennas 16, 18 during the first symbol period. The symbol $s_1$ is transmitted by antenna 16 and arrives at mobile terminal 100 over three different multipath propagation channels denoted as C1, C2, and C3. Symbol $s_2$ is transmitted by antenna 18 and arrives at mobile terminal 100 over multipath propagation channels C4, C5, and C6. Symbols $s_1$ and $s_2$ are referred to herein as the first diversity signals. More particularly, channels C1 and C4 are reflected by reflector R1 and combine to form a first multipath echo $r_{1,1}$. It is assumed that the path delay for channels C1 and C4 are the same. Similarly, channels C2 and C5 are reflected by reflector R2 and combine to form a second multipath echo $r_{1,2}$. The path delay for channels C2 and C5 are assumed to be the same; however, the path delay for channels C2 and C5 are different from the path delay for channels C1 and C4. Channels C3 and C6 are reflected by reflector R3 and arrive at mobile terminal 100 to form a third multipath echo $r_{1,3}$ with a path delay different from echoes $r_{1,1}$ and $r_{1,2}$. While only three multipath echoes are shown in FIG. 3, there may, in fact, be numerous other echoes. Typically, the mobile terminal 10 will select three to six echoes for processing, as will be hereinafter described.

The same multipath phenomenon also applies during the second symbol period. Symbols $-s_2^*$ and $s_1^*$, referred to herein as the second diversity signals, combine and arrive at the mobile terminal 100 over different propagation channels. The multiple multipath echoes $r_{2,l}$ arrive at the mobile terminal 100 with different path delays. Note that the echoes $r_{2,l}$ may overlap and combine with the multipath echoes $r_{1,l}$.

The task of the mobile terminal 100 is to determine the transmitted symbols $s_1$ and $s_2$ based on the combined received signal r(t). To achieve this objective, the mobile terminal 100 must first extract the echoes $r_{1,l}$ and $r_{2,l}$ from the combined received signal r(t). In a CDMA system, this is done using a Rake receiver. The received echoes may be expressed as:

$$r_{1,l} = \int r(t-\tau_l) p_T^*(t) dt \qquad (6)$$
$$= c_{1,l} s_1 + c_{2,l} s_2 + z_{1,l}$$

and $$r_{2,l} = \int r(t+\tau_l+T) q_T^*(t) dt \qquad (7)$$
$$= -c_{1,l} s_2^* + c_{2,l} s_1^* + z_{2,l}$$

In Equations (6) and (7), it is assumed that the filtering characteristics of each multipath propagation channel remain constant over the two symbol periods. The variable z represents noise and interference.

One approach to determining the transmitted symbols $s_1$ and $s_2$ is to first despread the received signal r(t) to obtain the multipath echoes $r_{1,l}$ and $r_{2,l}$ according to Equations (6) and (7) and then separately decode each multipath echo $r_{1,l}$ and $r_{2,l}$ to obtain a plurality of estimates, denoted $\hat{s}_{1,l}$ and $\hat{s}_{2,l}$, of the transmitted symbols. The estimates $\hat{s}_{1,l}$ and $\hat{s}_{2,l}$ are given by the following equations:

$$\hat{s}_{1,l} = r_{1,l} c_{1,l}^* + r_{2,l}^* c_{2,l} \qquad (8)$$

$$\hat{s}_{2,l} = r_{1,l} c_{2,l}^* - r_{2,l}^* c_{1,l} \qquad (9)$$

The estimates $\hat{s}_{1,l}$ and $\hat{s}_{2,l}$ from each decoder may then be combined to obtain final estimates $\hat{s}_1$ and $\hat{s}_2$ of the originally transmitted symbols $s_1$ and $s_2$. The final estimates $\hat{s}_1$ and $\hat{s}_2$ of the transmitted symbols $s_1$ and $s_2$ are computed as follows:

$$\hat{s}_1 = \sum_{l=1}^{L} \hat{s}_{1,l} \qquad (10)$$

$$\hat{s}_2 = \sum_{l=1}^{L} \hat{s}_{2,l} \qquad (11)$$

Figure 5:
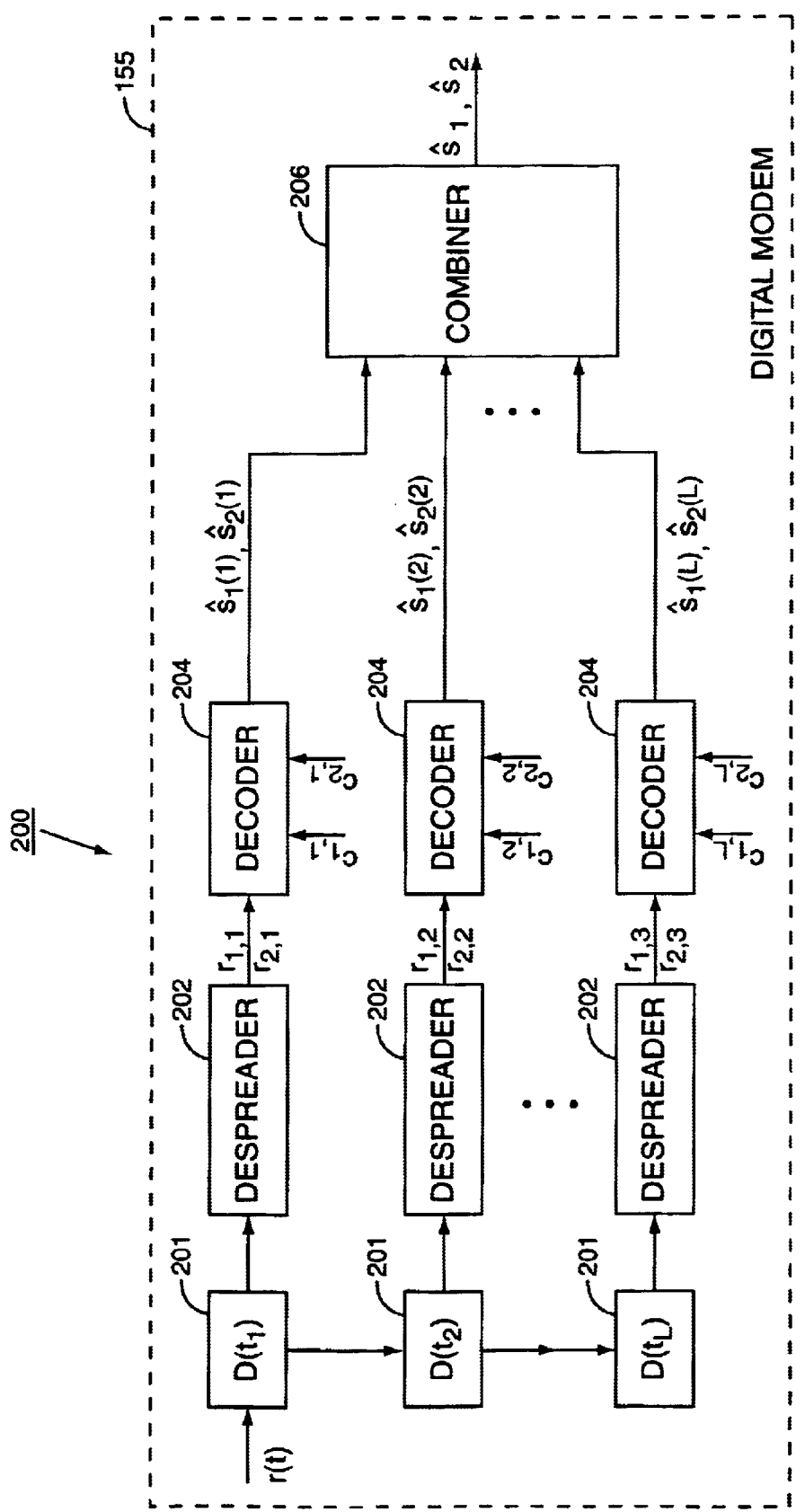
FIG. 5 illustrates a first embodiment of a receiver architecture according to the present invention.

FIG. 5 illustrates one embodiment of a diversity receiver 200 that implements this approach. The diversity receiver 200 comprises a plurality of despreaders or correlators 202, a plurality of diversity decoders 204, and a combiner 206. The despreaders 202 and diversity decoders 204 are arranged in parallel branches generally referred to as fingers. Each finger may include a variable delay 201 to time align the various multipath echoes of the received wideband signal in each finger. The combined received signal r(t) is input to respective despreaders 202, which despreads the received signal r(t) to obtain the multipath echoes $r_{1,l}$ and $r_{2,l}$. The output of each despreader 202 is one multipath echo $r_{1,l}$ and $r_{2,l}$. The received multipath echoes $r_{1,l}$ and $r_{2,l}$ are then input into a diversity decoder 204. In the embodiment shown in FIG. 5, a separate diversity decoder 204 is inserted into the signal path in each finger of the diversity receiver 200. The function of the diversity decoder 204 is to produce an estimate of the transmitted symbols $\hat{s}_{1,l}$ and $\hat{s}_{2,l}$ based on the received echoes $r_{1,l}$ and $r_{2,l}$. Note that in this embodiment, each diversity decoder 204 produces a separate estimate, denoted $\hat{s}_{1,l}$ and $\hat{s}_{2,l}$ of the transmitted symbols $s_1$ and $s_2$. The estimates $\hat{s}_{1,l}$ and $\hat{s}_{2,l}$ are then combined by combiner 206, which in this embodiment is a summer, to produce the final estimates $\hat{s}_1$ and $\hat{s}_{2,l}$ of the transmitted symbols. These final estimates $\hat{s}_1$ and $s_2$ from the combiner 206 are then decoded to obtain estimates of the transmitted bits.

While functional, the solution presented in FIG. 5 may be difficult to implement in existing designs, as it would require extensive retooling of the hardware in the mobile terminal 100 and may create a very large processing drain on the battery. An alternate structure for a diversity receiver can be obtained by rewriting Equations (10) and (11) as follows:

$$\hat{s}_1 = \sum_{l=1}^{L} \hat{s}_{1,l} = \sum_{l=1}^{L} (r_{1,l} c_{1,l}^* + r_{2,l}^* c_{2,l}) \qquad (12)$$
$$= \left( \sum_{l=1}^{L} r_{1,l} c_{1,l}^* \right) + \left( \sum_{l=1}^{L} r_{2,l} c_{2,l}^* \right)^*$$
$$\stackrel{\Delta}{=} \lambda_{1,1} + \lambda_{2,2}^*$$

$$\hat{s}_2 = \sum_{l=1}^{L} \hat{s}_{2,l} = \sum_{l=1}^{L} (r_{1,l} c_{2,l}^* - r_{2,l}^* c_{1,l}) \qquad (13)$$
$$= \left( \sum_{l=1}^{L} r_{1,l} c_{2,l}^* \right) - \left( \sum_{l=1}^{L} r_{2,l} c_{1,l}^* \right)^*$$
$$\stackrel{\Delta}{=} \lambda_{2,1} - \lambda_{1,2}^*$$

Note that in Equations (12) and (13), $\lambda_{i,j}$ represents the jth output of a non-transmit diversity Rake receiver matched to the ith transmit antenna. Thus, the metric $\lambda_{1,1}$ corresponds to the output of a first non-diversity Rake receiver, denoted by 210 in FIG. 6, matched to a first antenna 16 during a first symbol period and the metric $\lambda_{1,2}$ corresponds to the output of a first non-diversity Rake receiver, denoted by 212 in FIG. 6, matched to the first antenna 16 during a second symbol period. Similarly, the metric $\lambda_{2,1}$ corresponds to the output of a second non-diversity Rake receiver matched to a second antenna 18 during a first symbol period and the metric $\lambda_{2,2}$ corresponds to the output of the second non-diversity Rake receiver matched to the second antenna 18 during a second symbol period. The metrics $\lambda_{1,1}$ and $\lambda_{2,2}$ are used to produce an estimate $\hat{s}_1$ of the first transmitted symbol. The metrics $\lambda_{2,1}$ and $\lambda_{1,2}$ are used to produce an estimate $\hat{s}_2$ of the second transmitted symbol.

Figure 6:
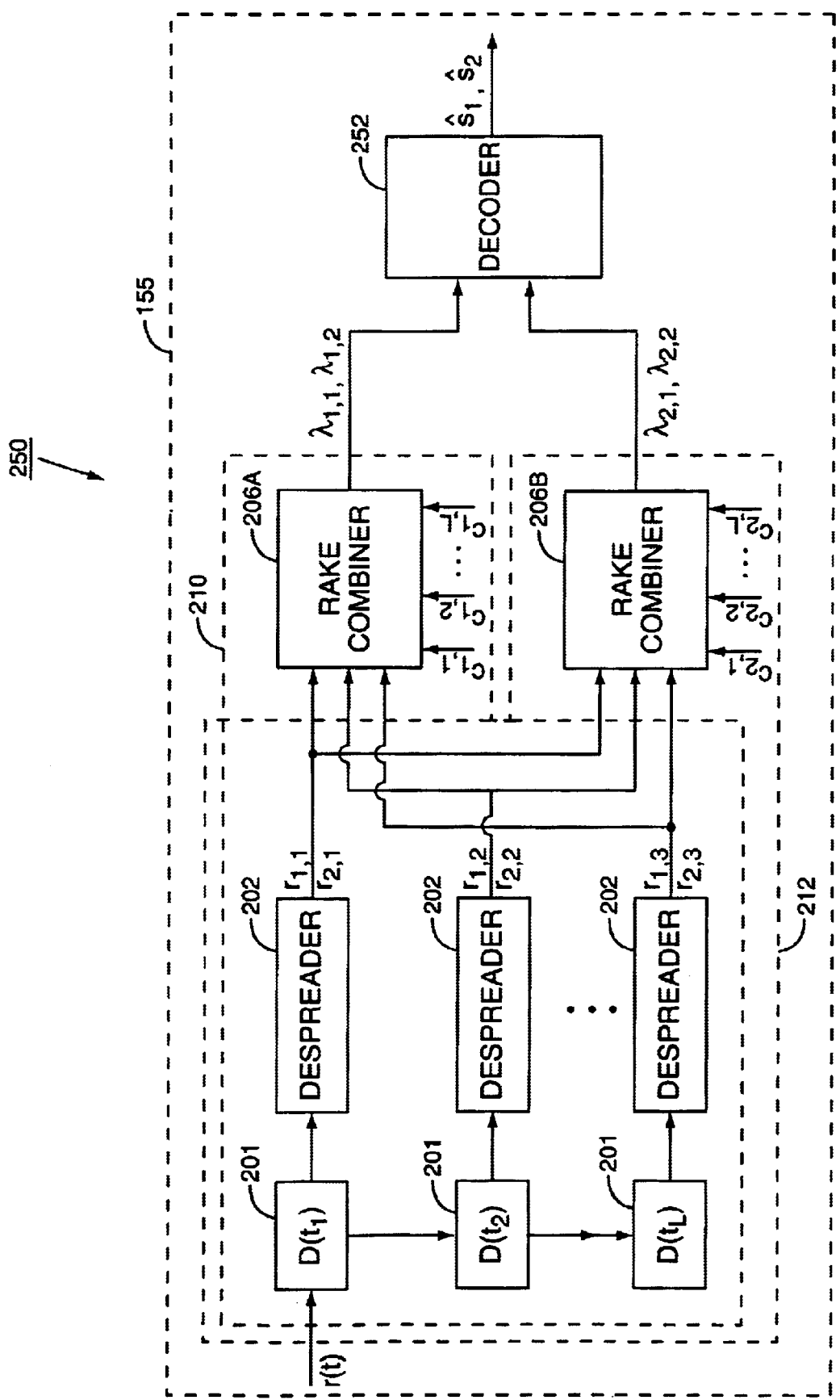
FIG. 6 illustrates a second embodiment of a receiver architecture according to the present invention.

FIG. 6 is a functional block diagram of a diversity receiver 250 implementing the approach of Equations (12) and (13). The diversity receiver 250 of FIG. 6 comprises a plurality of despreaders or correlators 202, a pair of Rake combiners 206A and 206B, and a decoder 252. The despreaders 202 are disposed in separate fingers of the diversity receiver 250. Each finger includes a variable delay 201 to time align with the various multipath echoes $r_{1,l}$ and $r_{2,l}$ of the combined received signal r(t). Despreader 202 despreads the received signal r(t) to recover the multipath echoes $r_{1,l}$ and $r_{2,l}$. During the first symbol period, the despreaders 202 output the received multipath echoes $r_{1,l}$ of the combined received signal r(t). During the second symbol period, the despreaders 202 output the received multipath echoes $r_{2,l}$ of the combined received signal r(t). The received multipath echoes $r_{1,l}$ and $r_{2,l}$ are input to Rake combiners 206A and 206B. Rake combiner 206A is matched to the first transmit antenna 16 and Rake combiner 206B is matched to the second transmit antenna 18.

During the first symbol period, Rake combiner 206A combines the received multipath echoes $r_{1,l}$ according to the first part of Equation (12) using channel estimates $c_{1,l}$ corresponding to the selected multipath propagation channels from the first antenna 16 to the mobile terminal 100 to obtain the metric $\lambda_{1,1}$. Rake combiner 206B combines the received multipath echoes $r_{1,l}$ according to the second part of Equation (12) using channel estimates $c_{2,l}$ corresponding the selected multipath propagation channels from the second antenna 18 to obtain the metric $\lambda_{2,1}$ During the second symbol period, Rake combiner 206A combines the received multipath echoes $r_{2,l}$ according to the first part of Equation (13) using channel estimates $c_{2,l}$ to obtain the metric $\lambda_{1,2}$. Rake combiner 206B combines the received multipath echoes $r_{2,l}$ according to the second part of Equation (11) using channel estimates $C_{2,l}$ to obtain the metric $\lambda_{2,2}$. The metrics $\lambda_{1,1}$, $\lambda_{2,1}$, $\lambda_{1,2}$, and $\lambda_{2,2}$ are then input to the decoder 252. Decoder 252 computes the estimate $\hat{s}_1$ of the first transmitted symbol according to Equation (12) by adding $\lambda_{1,2}$ and the conjugate of $\lambda_{2,2}$. Decoder 252 also computes the estimate $\hat{s}_2$ of the second transmitted symbol according to Equation (13) by subtracting the conjugate of $\lambda_{1,2}$ from $\lambda_{2,1}$.

The diversity receiver shown in FIGS. 5 and 6 can also be used with other STCs, such as OTD and STS. In OTD mode, four consecutive bits $\{b_1, b_2, b_3, b_4\}$ are mapped to two QPSK symbols $$s_1 = b_1 + jb_3 \quad (14)$$

$$s_2 = b_2 + jb_4 \quad (15)$$

Symbols $s_1$ and $s_2$ are transmitted by two antennas as shown in Table 2 below:

TABLE 2

Encoding and Transmission Sequence for OTD

|  | time t | time t + T |
|---|---|---|
| Antenna 1 | $s_1$ | $s_1$ |
| Antenna 2 | $s_2$ | $-s_2$ |

At the receiver 250, the Rake combiners 206A and 206B calculate $\{\lambda_{1,1}, \lambda_{1,2}, \lambda_{2,1}, \lambda_{2,2}\}$ as in STTD, whereas the diversity decoder 252 calculates $\hat{s}_1$ and $\hat{s}_2$ as follows:

$$\hat{s}_1 = \lambda_{1,1} + \lambda_{1,2} \quad (16)$$

$$\hat{s}_2 = \lambda_{2,1} - \lambda_{2,2} \quad (17)$$

In STS mode, four consecutive bits $\{b_1, b_2, b_3, b_4\}$ are mapped to two symbols $$s_1 = (b_1 - b_2) + j(b_3 + b_4) \quad (18)$$

$$s_2 = (b_1 + b_2) + j(b_3 - b_4) \quad (19)$$

Symbols $s_1$ and $s_2$ are transmitted by two antennas 16, 18 as shown in Table 3 below:

TABLE 3

Encoding and Transmission Sequence for STS

|  | time t | time t + T |
|---|---|---|
| Antenna 1 | $s_1$ | $s_2$ |
| Antenna 2 | $s_2^*$ | $-s_1^*$ |

At the receiver, Rake combiners 206A and 206B calculate $\{\lambda_{1,1}, \lambda_{1,2}, \lambda_{2,1}, \lambda_{2,2}\}$ as in STTD and OTD, whereas the diversity decoder 252 calculates $\hat{s}_1$ and $\hat{s}_2$ as follows:

$$\hat{s}_1 = \lambda_{1,1} - \lambda_{2,2}^* \quad (20)$$

$$\hat{s}_2 = \lambda_{2,1}^* + \lambda_{1,2} \quad (21)$$

Note that while the present invention has been discussed as being present in a mobile terminal 100, it is also possible that it may be implemented at other receivers within the wireless communications network 10, such as at the base station 12. There would not be a need for such a placement unless mobile terminal 100 had transmit diversity transmission capability, but is possible nonetheless.

Figure 7:
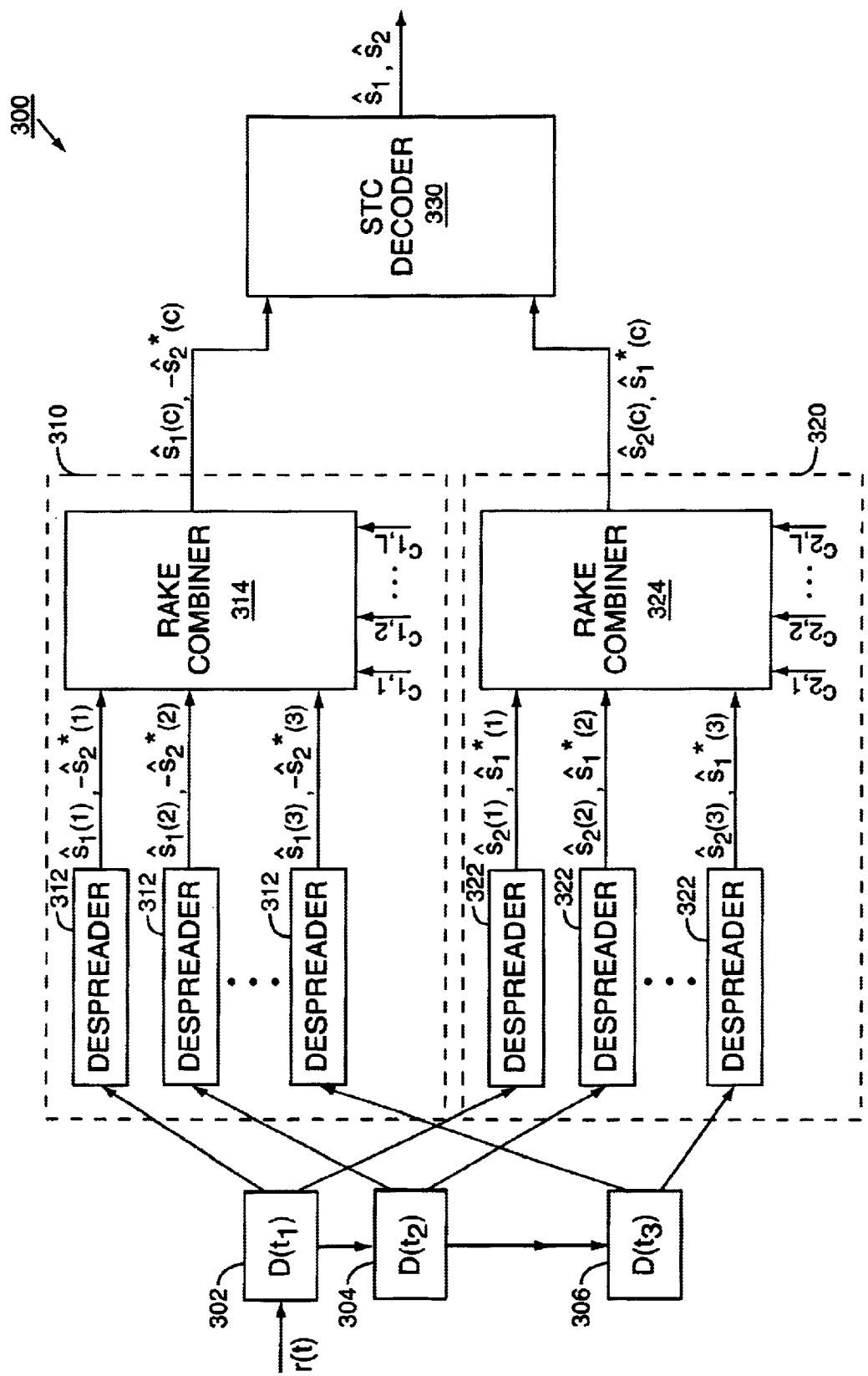
FIG. 7 illustrates a third embodiment of a receiver architecture according to the present invention.

FIG. 7 illustrates a third embodiment of a receiver architecture for a CDMA receiver 300 according to the present invention. The receiver 300 of FIG. 7 may be used when antennas 16, 18 transmit using two different spreading sequences. Receiver 300 comprises a first non-diversity Rake receiver 310 and a second non-diversity Rake receiver 320. Rake receiver 310 comprises a plurality of despreaders 312 and a Rake combiner 314. Rake receiver 320 comprises a plurality of despreaders 322 and a Rake combiner 324. Despreaders 312, 322 receiver delayed versions of the received signal r(t) from delay blocks 302, 304, 306. Delayed blocks 302, 304, 306 supply the delayed versions of the received signal r(t) to corresponding despreaders 312, 322 in both the first and second Rake receivers 310, 320 respectively. Despreaders 312 use the spreading sequence associated with the first transmit antenna 16 to despread the received signal r(t). The output of the despreaders 312 in the first symbol period is an estimate of $s_1$. The output of despreaders 312 during the second symbol period is an estimate of $-s_2^*$. Despreaders 322 use the spreading sequence associated with the second transmit antenna 18 to despread the received signal r(t). The output of despreaders 322 during the first symbol period is an estimate of $s_2$. The output of the despreaders 322 during the second transmit period is an estimate of $s_1^*$. Rake combiners 314, 324 combine the individual estimates output from the despreaders 312, 322 respectively. The combined estimates generated by the Rake combiners 314, 324 are then supplied to an STC decoder 330 which generates the final estimates of the transmitted symbols $s_1$ and $s_2$.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A diversity method implemented by a CDMA receiver, said method comprising:

receiving a combined received signal during first and second symbol periods, said combined received signal representing first and second transmit symbols encoded according to a space-time code and transmitted from first and second transmit antennas;

selecting a first set of multipath echoes associated with said first symbol period and a second set of multipath echoes associated with said second symbol period;

computing a first value based on said first set of said multipath echoes and a plurality of channel estimates corresponding to a first set of multipath propagation channels associated with said first antenna;

computing a second value based on said second set of said multipath echoes and a plurality of channel estimates corresponding to said first set of multipath propagation channels associated with said first antenna;

computing a third value based on said first set of said multipath echoes and a plurality of channel estimates corresponding to a second set of multipath propagation channels associated with said second antenna;

computing a fourth value based on said second set of said multipath echoes and a plurality of channel estimates corresponding to said second set multipath propagation channels associated with said second antenna;

thereafter, selectively combining said first, second, third and fourth values to generate estimates of said first and second transmit symbols.

2. The diversity method of claim 1 wherein computing a first value based on said first set of said multipath echoes and a plurality of channel estimates corresponding to a first set of multipath propagation channels associated with said first antenna comprises multiplying each said multipath echo in said first set of multipath echoes by a corresponding channel estimate in said first set of multipath propagation channels to obtain a first set of filtered multipath echoes and summing said first set of filtered multipath echoes to obtain said first value.

3. The diversity method of claim 1 wherein computing a second value based on said second set of said multipath echoes and a plurality of channel estimates corresponding to said first set of multipath propagation channels associated with said first antenna comprises multiplying each said multipath echo in said second set of multipath echoes by a corresponding channel estimate in said first set of multipath propagation channels to obtain a second set of filtered multipath echoes and summing said second set of filtered multipath echoes to obtain said second value.

4. The diversity method of claim 1 wherein computing a third value based on said first set of said multipath echoes and a plurality of channel estimates corresponding to a second set of multipath propagation channels associated with said second antenna comprises multiplying each said multipath echo in said second set of multipath echoes by a corresponding channel estimate in said first set of multipath propagation channels to obtain a third set of filtered multipath echoes and summing said third set of filtered multipath echoes to obtain said third value.

5. The diversity method of claim 1 wherein computing a fourth value based on said second set of said multipath echoes and a plurality of channel estimates corresponding to said second set multipath propagation channels associated with said second antenna comprises multiplying each said multipath echo in said second set of multipath echoes by a corresponding channel estimate in said second set of multipath propagation channels to obtain a fourth set of filtered multipath echoes and summing said fourth set of filtered multipath echoes to obtain said fourth value.

6. The diversity method of claim 1 wherein selectively combining said first, second, third and fourth values to generate estimates of said first and second transmit symbols comprises adding said first and fourth values to obtain said estimate of said first transmit symbol and combining said second and third values to obtain said estimate of said second transmit symbol.

7. A diversity method implemented by a CDMA receiver, said method comprising:

receiving a combined received signal during first and second symbol periods, said combined received signal representing first and second transmit symbols encoded according to a space-time code and transmitted from first and second transmit antennas;

selecting a first set of multipath echoes associated with said first symbol period and a second set of multipath echoes associated with said second symbol period;

combining said first set of said multipath echoes with a first Rake receiver matched to said first antenna to obtain a first value;

combining said first set of said multipath echoes with a second Rake receiver matched to said second antenna to obtain a second value;

combining said second set of said multipath echoes with a first Rake receiver matched to said first antenna to obtain a third value;

combining said second set of said multipath echoes with a second Rake receiver matched to said second antenna to obtain a fourth value;

thereafter, decoding said first, second, third and fourth values to generate estimates of said first and second transmit symbols.

8. The diversity method of claim 7 wherein combining said first set of said multipath echoes with a first Rake receiver matched to said first antenna to obtain a first value comprises multiplying each said multipath echo in said first set of multipath echoes by a corresponding channel estimate in a first set of multipath propagation channels associated with said first antenna to obtain a first set of filtered multipath echoes and summing said first set of filtered multipath echoes to obtain said first value.

9. The diversity method of claim 7 wherein combining said first set of said multipath echoes with a second Rake receiver matched to said second antenna to obtain a second value comprises multiplying each said multipath echo in said second set of multipath echoes by a corresponding channel estimate in said second set of multipath propagation channels associated with said second antenna to obtain a second set of filtered multipath echoes and summing said second set of filtered multipath echoes to obtain said second value.

10. The diversity method of claim 7 wherein combining said second set of said multipath echoes with a first Rake receiver matched to said first antenna to obtain a third value comprises multiplying each said multipath echo in said second set of multipath echoes by a corresponding channel estimate in said first set of multipath propagation channels associated with said first antenna to obtain a third set of filtered multipath echoes and summing said third set of filtered multipath echoes to obtain said third value.

11. The diversity method of claim 7 wherein combining said second set of said multipath echoes with a second Rake receiver matched to said second antenna to obtain a fourth value comprises multiplying each said multipath echo in said second set of multipath echoes by a corresponding channel estimate in said second set of multipath propagation channels associated with said second antenna to obtain a fourth set of filtered multipath echoes and summing said fourth set of filtered multipath echoes to obtain said fourth value.

12. The diversity method of claim 7 wherein decoding said first, second, third and fourth values to generate estimates of said first and second transmit symbols comprises adding said first and fourth values to obtain said estimate of said first transmit symbol and combining said second and third values to obtain said estimate of said second transmit symbol.

13. A diversity receiver comprising:
- an antenna to receive a combined received signal during first and second symbol periods, said combined received signal representing first and second transmit symbols encoded according to a space-time code and transmitted from first and second transmit antennas;
- a plurality of despreaders to despread a first set of multipath echoes of said combined received signal associated with said first symbol period and a second set of multipath echoes of said combined received signal associated with said second symbol period;
- a first combiner matched to said first antenna to combine said first and second sets of multipath echoes to obtain first and second values;
- a second combiner matched to said second antenna to combine said first and second sets of multipath echoes to obtain third and fourth values; and
- a decoder to selectively combine said first, second, third and fourth values to obtain estimates of said first and second transmit signals.

14. The diversity receiver of claim 13 wherein said first and second combiners are Rake combiners.

15. A diversity receiver comprising:
- an antenna to receive a combined received signal during first and second symbol periods, said combined received signal representing first and second transmit symbols encoded according to a space-time code and transmitted from first and second transmit antennas;
- a plurality of despreaders to despread a first set of multipath echoes of said combined signal associated with said first symbol period and a second set of multipath echoes of said combined received signal associated with said second symbol period;
- a plurality of decoders to separately decode said multipath echoes of said combined received signal to obtain a plurality of estimates of said first and second transmit symbols and;
- a combiner to combine said estimates of said first transmit symbol together and to combine said estimates of said second transmit symbol together.

16. The diversity receiver of claim 15 wherein said combiner is a Rake combiner.

17. A diversity method implemented by a CDMA receiver, said method comprising:
- receiving a combined received signal during first and second symbol periods, said combined received signal representing first and second transmit symbols encoded according to a space-time code and transmitted from first and second transmit antennas;
- despreading said combined received signal with a plurality of despreaders to obtain a first set of multipath echoes of said combined received signal associated with said first symbol period and a second set of multipath echoes of said combined received signal associated with said second symbol period;
- decoding separately corresponding ones of said first and second set of multipath echoes to obtain a plurality of estimates of said first and second transmit symbols; and
- combining said plurality of estimates of said first and second transmit symbols.

* * * * *